United States Patent [19]
Warzelhan et al.

[11] Patent Number: 6,111,058
[45] Date of Patent: Aug. 29, 2000

[54] BIODEGRADABLE POLYESTERAMIDE AND A PROCESS OF PREPARING

[75] Inventors: Volker Warzelhan, Weisenheim; Matthias Kroner, Eisenberg; Jürgen Hofmann; Ursula Seeliger, both of Ludwigshafen; Motonori Yamamoto, Mannheim; Peter Bauer, Ludwigshafen, all of Germany

[73] Assignee: BASF Aktiengesellschaft, Ludwigshafen, Germany

[21] Appl. No.: 08/860,023

[22] PCT Filed: Jan. 8, 1996

[86] PCT No.: PCT/EP96/00067

§ 371 Date: Jul. 3, 1997

§ 102(e) Date: Jul. 3, 1997

[87] PCT Pub. No.: WO96/21692

PCT Pub. Date: Jul. 18, 1996

[30] Foreign Application Priority Data

Jan. 13, 1995 [DE] Germany ............... 195 00 756

[51] Int. Cl.⁷ ............ C08G 18/60; C08G 69/44
[52] U.S. Cl. ............ 528/332; 528/170; 528/172; 528/173; 528/272; 528/289; 528/310; 528/335; 528/336
[58] Field of Search ............ 528/170, 172, 528/173, 272; 521/289, 310, 332, 335, 336

[56] References Cited

U.S. PATENT DOCUMENTS

| | | |
|---|---|---|
| 3,803,259 | 4/1974 | Porchey et al. |
| 4,328,049 | 5/1982 | Richardson .................. 148/9 |
| 4,328,059 | 5/1982 | Horlbeck et al. ............. 156/332 |

FOREIGN PATENT DOCUMENTS

| | | |
|---|---|---|
| 7 445 | 2/1980 | European Pat. Off. |
| 13 461 | 7/1980 | European Pat. Off. |
| 21 042 | 1/1981 | European Pat. Off. |
| 28 687 | 5/1981 | European Pat. Off. |
| 372 846 | 6/1990 | European Pat. Off. |
| 515 203 | 11/1992 | European Pat. Off. |
| 534 295 | 3/1993 | European Pat. Off. |
| 565 235 | 10/1993 | European Pat. Off. |
| 818 157 | 8/1959 | United Kingdom . |
| 1115512 | 5/1965 | United Kingdom . |
| 1010916 | 11/1965 | United Kingdom . |
| 1164331 | 9/1969 | United Kingdom . |
| 90/05161 | 5/1990 | WIPO . |
| 92/00441 | 1/1992 | WIPO . |
| 92/13019 | 8/1992 | WIPO . |

OTHER PUBLICATIONS

Handbook of Polymeric foams . . . , Shutov, 375–408, 1991, The month of publication in the date is not available.
Adhesive Comp., P. 547–577, Encycl. of Polym. Sci. and Eng., vol. 1, The month of publication in the date is not available.
Kunststoff–Handbuch, Bd. 3/1, p. 24–28, 1992, The month of publication in the date is not available.
J. of Appl. Polym. Sci., vol. 32, p. 6191–6207, 1986, The month of publication in the date is not available.
Roempp Chem. Lexikon, Bd. 6, Ny, 9. Aufl., p. 4626–4633 and 5136–5143, 1992, The month of publication in the date is not available.
Sax Toxic Sub. Data Book, Fujiyama et al., p. 360, The date of publication is not available.
B Fortunato et al., Poly, vol. 35, Nr. 18, p. 4006–4010, 1994, The date of publication is not available.
Enc of Poly. Sci and Eng., Bd. 12, 2nd Ed., p. 1–75, 1988, The month of publication in the date is not available.
Kunststoff–Handbuch, Bd. 3/1, p. 15–23, 1992, Muenchen, The month of publication in the date is not available.
Agnew. Chem. int. Edit., vol. 11, p. 287–288, 1972, The month of publication in the date is not available.
Sorensen + Campbell, Prep. Methods of poly. Chem., Interscience Pub., p. 111–127, 1961, The month of publication in the date is not available.
J. Biochem. vol. 59, p. 537, 1966, The month of publication in the date is not available.
Plant Cell Physiol., vol. 7, s. 93, 1966, The month of publication in the date is not available.
Agric. Biol. Chem., vol. 39, p. 1219, 1975, The month of publication in the date is not available.
J. of Apll. Poly. Sci., Bd. 24, p. 1701–1711, 1979, The month of publication in the date is not available.
J. of Appl. Poly. Sci., Bd., 26, p. 441–448, 1981, The month of publication in the date is not available.
Y. Tokiwa et al., Nature, Bd. 270, p. 76–78, 1977, The month of publication in the date is not available.

*Primary Examiner*—P. Hampton-Hightower
*Attorney, Agent, or Firm*—Keil & Weinkauf

[57] ABSTRACT

Biodegradable polyesteramides as defined in the specification obtained by reacting a mixture consisting essentially of (a1) from 95 to 99.9% by weight of a polyesteramide,
(a2) from 0.1 to 5% by weight of a divinyl ether, and
(a3) from 0 to 5 mol % of compound D as defined in the specification, and other biodegradable polymers and thermoplastic molding compositions, processes for the preparation thereof, the use thereof for producing biodegradable moldings, and adhesives, biodegradable moldings obtained from the polymers and molding compositions according to the invention.

15 Claims, No Drawings

BIODEGRADABLE POLYESTERAMIDE AND A PROCESS OF PREPARING

BACKGROUND OF THE INVENTION

1. Field of the Invention

The present invention relates to biodegradable polyesteramides Q1 with a molecular weight ($M_n$) in the range from 5,000 to 50,000 g/mol, a viscosity number in the range from 30 to 450 g/ml (measured in o-dichlorobenzene/phenol (50/50 ratio by weight) at a concentration of 0.5% by weight of polyesteramide Q1 at 25° C.) and a melting point in the range from 50 to 220° C., obtainable by reacting a mixture consisting essentially of (a1) from 95 to 99.9% by weight of a polyesteramide P1 obtainable by reacting a mixture consisting essentially of (b1) a mixture consisting essentially of 35–95 mol % of adipic acid or ester-forming derivatives thereof or mixtures thereof, 5–65 mol % of terephthalic acid or ester-forming derivatives thereof or mixtures thereof, and 0–5 mol % of a compound containing sulfonate groups, where the total of the individual mole percentages is 100 mol %, and (b2) a mixture consisting essentially of (b21) 99.5–0.5 mol % of a dihydroxy compound selected from the group consisting of $C_2$–$C_6$-alkanediols and $C_5$–$C_{10}$-cycloalkanediols, (b22) 0.5–99.5 mol % of an amino-$C_2$–$C_{12}$-alkanol or of an amino-$C_5$–$C_{10}$-cycloalkanol, and (b23) 0–50 mol % of a diamino-$C_1$–$C_8$-alkane, (b24) 0–50 mol % of a 2,2'-bisoxazoline of the general formula I

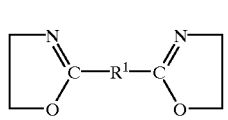

I where $R^1$ is a single bond, a $(CH_2)_q$-alkylene group with q=2, 3 or 4, or a phenylene group, where the total of the individual mole percentages is 100 mol %, and where the molar ratio of (b1) to (b2) is chosen in the range from 0.4:1 to 1.5:1, with the proviso that the polyesteramides P1 have a molecular weight ($M_n$) in the range from 4,000 to 40,000 g/mol, a viscosity number in the range from 30 to 450 g/ml (measured in o-dichlorobenzene/phenol (50/50 ratio by weight) at a concentration of 0.5% by weight of polyesteramide P1 at 25° C.) and a melting point in the range from 50 to 220° C., and with the further proviso that from 0 to 5 mol %, based on the molar amount of component (a1) used, of a compound D with at least three groups capable of ester formation are used to prepare the polyesteramides P1, (a2) from 0.1 to 5% by weight of a divinyl ether C1 and (a3) from 0 to 5 mol %, based on component (b1) from the preparation of P1, of compound D.

The invention furthermore relates to polymers and biodegradable thermoplastic molding compositions as claimed in the dependent claims, processes for the preparation thereof, the use thereof for producing biodegradable moldings and adhesives, biodegradable moldings, foams and blends with starch, obtainable from the polymers and molding compositions according to the invention.

2. Description of Related Art

Polymers which are biodegradable, ie. decompose under environmental influences in an appropriate and demonstrable time span, have been known for some time. This degradation usually takes place by hydrolysis and/or oxidation, but predominantly by the action of microorganisms such as bacteria, yeasts, fungi and algae. Y. Tokiwa and T. Suzuki (Nature, 270, (1977) 76–78) describe the enzymatic degradation of aliphatic polyesters, for example including polyesters based on succinic acid and aliphatic diols.

EP-A 565,235 describes aliphatic copolyesters containing [—NH—C(O)O—] groups (urethane units). The copolyesters of EP-A 565,235 are obtained by reacting a prepolyester, which is obtained by reacting essentially succinic acid and an aliphatic diol, with a diisocyanate, preferably hexamethylene diisocyanate. The reaction with the diisocyanate is necessary according to EP-A 565,235 because the polycondensation alone results only in polymers with molecular weights such that they display unsatisfactory mechanical properties. A crucial disadvantage is the use of succinic acid or ester derivatives thereof to prepare the copolyesters because succinic acid and derivatives thereof are costly and are not available in adequate quantity on the market. In addition, the polyesters prepared using succinic acid as the only acid component are degraded only extremely slowly.

Chain extension can, according to EP-A 534 295, also be advantageously achieved by reaction with divinyl ethers.

WO 92/13019 discloses copolyesters based on predominantly aromatic dicarboxylic acids and aliphatic diols, where at least 85 mol % of the polyester diol residue comprises a terephthalic acid residue. The hydrophilicity of the copolyester can be increased and the crystallinity can be reduced by modifications such as incorporation of up to 2.5 mol % of metal salts of 5-sulfoisophthalic acid or short-chain ether diol segments such as diethylene glycol. This is said in WO 92/13019 to make the copolyesters biodegradable. However, a disadvantage of these copolyesters is that biodegradation by microorganisms was not demonstrated, on the contrary only the behavior towards hydrolysis in boiling water or, in some cases, also with water at 60° C. was carried out.

According to Y. Tokiwa and T. Suzuki, (Nature, 270 (1977), and J. Appl. Polymer Science, 26 (1981), 441–448), it can be assumed that polyesters built up substantially from aromatic dicarboxylic acid units and aliphatic diols, such as PET (polyethylene terephthalate) and PBT (polybutylene terephthalate), cannot be degraded enzymatically. This also applies to copolyesters containing blocks built up from aromatic dicarboxylic acid units and aliphatic diols.

In addition, Y. Tokiwa, T. Suzuki and T. Ando (J. of Appl. Polym. Sci. 24 (1979) 1701–1711) prepared polyesteramides and blends of polycaprolactone and various aliphatic polyamides such as polyamide-6, polyamide-66, polyamide-11, polyamide-12 and polyamide-69 by melt condensation and investigated their biodegradability by lipases. It was found that the biodegradability of such polyesteramides depends greatly on whether there is a predominantly random distribution of the amide segments or, for example, a block structure. In general, amide segments tend to reduce the rate of biodegradation by lipases.

However, the crucial factor is that no lengthy amide blocks are present, because it is known from Plant Cell Physiol. 7 (1966) 93, J. Biochem. 59 (1966) 537 and Agric. Biol. Chem. 39 (1975) 1219 that the usual alipatic and aromatic polyamides are biodegradable at the most only when oligomers, otherwise not.

Witt et al. (handout for a poster at the International Workshop of the Royal Institute of Technology, Stockholm, Sweden, Apr. 21–23, 1994) describe biodegradable copolyesters based on 1,3-propanediol, terephthalic ester and adipic or sebacic acid. A disadvantage of these copolyesters is that moldings produced therefrom, especially sheets, have inadequate mechanical properties.

BRIEF SUMMARY OF THE INVENTION

It is an object of the present invention to provide polymers which are degradable biologically, ie. by microorganisms, and which do not have these disadvantages. The intention was, in particular, that the polymers according to the invention be preparable from known and low-cost monomer units and be insoluble in water. It was furthermore the intention that it be possible to obtain products tailored for the desired uses according to the invention by specific modifications such as chain extension, incorporation of hydrophilic groups and groups having a branching action. The aim was moreover that the biodegradation by microorganisms should not be achieved at the expense of the mechanical properties in order not to restrict the number of applications.

We have found that this object is achieved by the polymers and thermoplastic molding compositions defined at the outset.

We have furthermore found processes for the preparation thereof, the use thereof for producing biodegradable moldings and adhesives, and biodegradable moldings, foams, blends with starch and ahdesives obtainable from the polymers and molding compositions according to the invention.

DETAILED DESCRIPTION OF THE INVENTION

The biodegradable polyesteramides Q1 according to the invention have a molecular weight ($M_n$) in the range from 5,000 to 50,000, preferably from 6,000 to 50,000, particularly preferably from 8,000 to 35,000, g/mol, a viscosity number in the range from 30 to 450, preferably from 50 to 400, g/ml (measured in o-dichlorobenzene/phenol (50/50 ratio by weight) at a concentration of 0.5% by weight of polyesteramide Q1 at 25° C.), and a melting point in the range from 50 to 220° C., preferably from 60 to 220° C.

The polyesteramides Q1 are obtained according to the invention by reacting a mixture consisting essentially of a1) from 95 to 99.9, preferably from 96 to 99.8, particularly preferably from 97 to 99.65, % by weight of a polyesteramide P1, a2) from 0.1 to 5, preferably 0.2–4, particularly preferably from 0.35 to 3, % by weight of a divinyl ether C1 and a3) from 0 to 5, preferably from 0 to 4, mol % based on component (b1) from the preparation of P1, of a compound D.

Preferred polyesteramides P1 have a molecular weight ($M_n$) in the range from 4,000 to 40,000, preferably from 5,000 to 35,000, particularly preferably from 6,000 to 30,000, g/mol, a viscosity number in the range from 30 to 350, preferably from 50 to 300, g/ml (measured in o-dichlorobenzene/phenol (50/50 ratio by weight) at a concentration of 0.5% by weight of polyesteramide P1 at 25° C.), and a melting point in the range from 50 to 220° C., preferably from 60 to 220° C.

The polyesteramides P1 are obtained as a rule by reacting a mixture consisting essentially of (b1) a mixture consisting essentially of 35–95, preferably from 45 to 80, mol % of adipic acid or ester-forming derivatives thereof, in particular the di-$C_1$–$C_6$-alkyl esters such as dimethyl, diethyl, dipropyl, dibutyl, dipentyl and dihexyl adipate, or mixtures thereof, preferably adipic acid and dimethyl adipate, or mixtures thereof, 5–65, preferably 20–55, mol %, of terephthalic acid or ester-forming derivatives thereof, in particular the di-$C_1$–$C_6$-alkyl esters such as dimethyl, diethyl, dipropyl, dibutyl, dipentyl or dihexyl terephthalate, or mixtures thereof, preferably terephthalic acid and dimethyl terephthalate, or mixtures thereof, and 0–5, preferably from 0 to 3, particularly preferably from 0.1 to 2, mol % of a compound containing sulfonate groups, where the total of the individual mole percentages is 100 mol %, and (b2) a mixture consisting essentially of (b21) 99.5–0.5, preferably 99.5–50, particularly preferably 98.0–70, mol % of a dihydroxy compound selected from the group consisting of $C_2$–$C_6$-alkanediols and $C_5$–$C_{10}$-cycloalkanediols, (b22) 0.5–99.5, preferably 0.5–50, particularly preferably 1 to 30, mol % of an amino-$C_2$–$C_{12}$-alkanol or of an amino-$C_5$–$C_{10}$-cycloalkanol, and (b23) 0–50, preferably from 0 to 35, particularly preferably from 0.5 to 30, mol % of a diamino-$C_1$–$C_8$-alkane, (b24) 0–50, preferably 0–30, particularly preferably 0.5–20, of a 2,2'-bisoxazoline of the general formula I

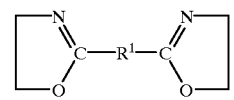

where $R^1$ is a single bond, an ethylene, n-propylene or n-butylene group, or a phenylene group , and $R^1$ is particularly preferably n-butylene, where the total of the individual mole percentages is 100 mol %, where the molar ratio of (b1) to (b2) is chosen in the range from 0.4:1 to 1.5:1, preferably from 0.6:1 to 1.1:1.

The compound containing sulfonate groups which is normally employed is an alkali metal or alkaline earth metal salt of a dicarboxylic acid containing sulfonate groups, or the ester-forming derivatives thereof, preferably alkali metal salts of 5-sulfo-isophthalic acid or mixtures thereof, particularly preferably the sodium salt.

The dihydroxy compounds (b21) employed according to the invention are selected from the group consisting of $C_2$–$C_6$-alkanediols, $C_5$–$C_{10}$-cycloalkanediols, the latter also including 1,2-cyclohexanedimethanol and 1,4-cyclohexanedimethanol, such as ethylene glycol, 1,2- and 1,3-propanediol, 1,2- and 1,4-butanediol, 1,5-pentanediol or 1,6-hexanediol, in particular ethylene glycol, 1,3-propanediol and 1,4-butanediol, cyclopentanediol, 1,4-cyclohexanediol and mixtures thereof.

The amino-$C_2$–$C_{12}$-alkanol or amino-$C_5$–$C_{10}$-cycloalkanol (component (b22)), which is intended to include 4-aminocyclohexanemethanol, which is preferably used is an amino-$C_2$–$C_6$-alkanol such as 2-aminoethanol, 3-aminopropanol, 4-aminobutanol, 5-aminopentanol or 6-aminohexanol, or amino-$C_5$–$C_6$-cycloalkanols such as aminocyclopentanol and aminocyclohexanol or mixtures thereof.

The diamino-$C_1$–$C_8$-alkane preferably employed is a diamino-$C_4$–$C_6$-alkane such as 1,4-diaminobutane, 1,5- diaminopentane and 1,6-diaminohexane (hexamethylenediamine, HMD).

The compounds of the general formula I (component b24) are, as a rule, obtainable by the process of Angew. Chem. int. Edit. 11 (1972) 287–288.

From 0 to 5, preferably from 0.01 to 4 mol %, based on component (a1), of at least one compound D with at least three groups capable of ester formation are used according to the invention.

The compounds D preferably contain three to ten functional groups capable of forming ester linkages. Particularly preferred compounds D have three to six functional groups of this type in the molecule, in particular three to six hydroxyl groups and/or carboxyl groups. Examples which may be mentioned are:

tartaric acid, citric acid, malic acid;
trimethylolpropane, trimethylolethane;
pentaerythritol;
polyethertriols;
glycerol;
trimesic acid;
trimellitic acid or anhydride;
pyromellitic acid or dianhydride and
hydroxyisophthalic acid.

When compounds D which have a boiling point below 200° C. are used in the preparation of the polyesters P1, a proportion may distil out of the polycondensation mixture before the reaction. It is therefore preferred to add these compounds in an early stage of the process, such as the transesterification or esterification stage, in order to avoid this complication and in order to achieve the maximum possible uniformity of their distribution within the polycondensate.

In the case of compounds D which boil above 200° C., they can also be employed in a later stage of the process.

By adding the compound D it is possible, for example, to alter the melt viscosity in a desired manner, to increase the impact strength and to reduce the crystallinity of the polymers or molding compositions according to the invention.

The preparation of the biodegradable polyesteramides P1 is known in principle (Sorensen and Campbell, Preparative Methods of Polymer Chemistry, Interscience Publishers, Inc., New York, 1961, pages 111–127; Kunststoff-Handbuch, volume 3/1, Carl Hanser Verlag, Munich, 1992, pages 15–23 (preparation of polyesteramides); WO 92/13019; EP-A 568,593; EP-A 565,235; EP-A 28,687 (preparation of polyesters); Encycl. of Polym. Science and Eng., vol. 12, 2nd Ed., John Wiley & Sons, 1988, pages 1–75, especially pages 59 and 60; GB 818157; GB 1010916; GB 1115512), so that details on this are superfluous.

Thus, for example, the reaction of dimethyl esters of component (b1) with component (b2) can be carried out at from 160 to 230° C. in the melt under atmospheric pressure, advantageously under an inert gas atmosphere.

In a preferred embodiment, initially the required amino hydroxy compound (b22) is reacted with component (b1), preferably terephthalic acid, dimethyl terephthalate, adipic acid, di-$C_2$–$C_6$-alkyl adipate, succinic anhydride, phthalic anhydride, in a molar ratio of 2:1.

In another preferred embodiment, the required diamine compound (b23) is reacted with component (b1), preferably terephthalic acid, dimethyl terephthalate, adipic acid, di-$C_2$–$C_6$-alkyl adipate, succinic anhydride, phthalic anhydride, in a molar ratio of at least 0.5:1, preferably 0.5:1.

In another preferred embodiment, the required 2,2'-bisoxazoline (b24) is reacted with component (b1), preferably terephthalic acid, dimethyl terephthalate, adipic acid, di-$C_2$–$C_6$-alkyl adipate, succinic anhydride, phthalic anhydride, in a molar ratio of at least 0.5:1, preferably 0.5:1.

In the case of a mixture of at least one amino hydroxy compound (b22) and at least one diamino compound (b23) and at least one 2,2'-bisoxazoline (b24), these are expediently reacted with component (b1) in the molar amounts stated in the abovementioned preferred embodiments.

In the preparation of the biodegradable polyesteramide P1, it is advantageous to use a molar excess of component (b2) relative to component b1, for example up to 2½ times, preferably up to 1.67 times.

The biodegradable polyesteramide P1 is normally prepared with the addition of suitable conventional catalysts (Encycl. of Polym. Science and Eng., vol. 12, 2nd Ed., John Wiley & Sons, 1988, pages 1–75, in particular pages 59 and 60; GB 818157; GB 1010916; GB 1115512), for example metal compounds based on the following elements such as Ti, Ge, Zn, Fe, Mn, Co, Zr, V, Ir, La, Ce, Li, and Ca, preferably organometallic compounds based on these metals, such as salts of organic acids, alkoxides, acetylacetonates and the like, particularly preferably based on lithium, zinc, tin and titanium.

When dicarboxylic acids or anhydrides thereof are used as component (b1), esterification thereof with component (b2) can take place before, at the same time as or after the transesterification. In a preferred embodiment, the process described in DE-A 23 26 026 for preparing modified polyalkylene terephthalates is used.

After the reaction of components (b1) and (b2), the polycondensation is carried out as far as the desired molecular weight, as a rule under reduced pressure or in a stream of inert gas, for example of nitrogen, with further heating to from 180 to 260° C.

In order to prevent unwanted degradation and/or side reactions, it is also possible in this stage of the process if required to add stabilizers. Examples of such stabilizers are the phosphorus compounds described in EP-A 13 461, U.S. Pat. No. 4,328,049 or in B. Fortunato et al., Polymer Vol. 35, No. 18, pages 4006–4010, 1994, Butterworth-Heinemann Ltd. These may also in some cases act as inactivators of the catalysts described above. Examples which may be mentioned are: organophosphites, phosphonous acid and phosphorous acid. Examples of compounds which act only as stabilizers are: trialkyl phosphites, triphenyl phosphite, trialkyl phosphates, triphenyl phosphate and tocopherol (vitamin E; obtainable as Uvinul® 2003AO (BASF) for example).

On use of the biodegradable copolymers, for example in the packaging sector, eg. for foodstuffs, it is as a rule desirable to select the lowest possible content of catalyst employed and not to employ any toxic compounds. In contrast to other heavy metals such as lead, tin, antimony, cadmium, chromium, etc., titanium and zinc compounds are non-toxic as a rule (Sax Toxic Substance Data Book, Shizuo Fujiyama, Maruzen, K. K., 360 S. (cited in EP-A 565,235), see also Römpp Chemie Lexikon Vol. 6, Thieme Verlag, Stuttgart, N.Y., 9th Edition, 1992, pages 4626–4633 and 5136–5143). Examples which may be mentioned are: dibutoxydiacetoacetoxytitanium, tetrabutyl orthotitanate and zinc(II) acetate.

The ratio by weight of catalyst to biodegradable polyesteramide P1 is normally in the range from 0.01:100 to 3:100, preferably from 0.05:100 to 2:100, it also being possible to employ smaller quantities, such as 0.0001:100, in the case of highly active titanium compounds.

The catalyst can be employed right at the start of the reaction, directly shortly before the removal of the excess diol or, if required, also distributed in a plurality of portions during the preparation of the biodegradable polyesteramides P1. It is also possible if required to employ different catalysts or mixtures thereof.

It is possible according to observations to date to employ as divinyl ethers C1 all conventional and commercially obtainable divinyl ethers. Preferably used divinyl ethers are selected from the group consisting of 1,4-butanediol divinyl ether, 1,6-hexanediol divinyl ether and 1,4-cyclohexanedimethanol divinyl ether.

The reaction, which is normally catalyzed by cations, of the polyesteramides P1 with the divinyl ether C1 preferably takes place in the melt, it being necessary to take care that, if possible, no side reactions which may lead to crosslinking or gel formation occur. In a particular embodiment, the reaction is normally carried out at from 90 to 230, preferably from 100 to 200° C., with the addition of the divinyl ether advantageously taking place in a plurality of portions or continuously.

If required it is also possible to carry out the reaction of the polyesteramides P1 with the divinyl ethers C1 in the presence of conventional inert solvents such as toluene, methyl ethyl ketone, tetrahydrofuran (THF) or ethyl acetate or mixtures thereof, in which case the reaction is as a rule carried out at from 80 to 200, preferably from 90 to 150° C.

The reaction with the divinyl ethers C1 can be carried out batchwise or continuously, for example in stirred vessels, reaction extruders or screw mixing heads.

It is also possible to employ in the reaction of the polyesteramides P1 with the divinyl ethers C1 conventional catalysts which are disclosed in the prior art (for example those described in EP-A 534295). Examples which may be mentioned are: organic carboxylic acids such as oxalic acid, tartaric acid and citric acid, it again being necessary to take care that, if possible, the compounds employed are not toxic.

Although the theoretical optimum for the reaction of P1 with divinyl ether C1 is a 1:1 molar ratio of vinyl ether functionality to P1 end group (polyesteramides P1 with predominantly hydroxyl end groups are preferred), the reaction can also be carried out without technical problems at molar ratios of from 1:3 to 1.5:1. With molar ratios of >1:1 it is possible if desired to add, during the reaction or else after the reaction, a chain extender selected from the components (b2), preferably a $C_2$–$C_6$-diol.

The biodegradable polymers T1 according to the invention have a molecular weight ($M_n$) in the range from 6,000 to 50,000, preferably from 8,000 to 40,000, particularly preferably from 8,000 to 35,000, g/mol, a viscosity number in the range from 30 to 450, preferably from 50 to 400, g/ml (measured in o-dichlorobenzene/phenol (50/50 ratio by weight) at a concentration of 0.5% by weight of polymer T1 at 25° C.) and a melting point in the range from 50 to 255, preferably from 60 to 255° C.

The biodegradable polymers T1 are obtained according to the invention by reacting the polyesteramides Q2 with (d1) 0.1–5, preferably from 0.2 to 4, particularly preferably from 0.3 to 2.5, % by weight, based on polyesteramide Q2, of divinyl ether C1 and with (d2) 0–5, preferably from 0 to 4, mol %, based on component (b1) from the preparation of polyesteramide Q2 via polyesteramide P1, of compound D.

This normally results in a chain extension, with the resulting polymer chains preferably having a block structure.

Preferred biodegradable polyesteramides Q2 have a molecular weight ($M_n$) in the range from 5,000 to 50,000, preferably from 6,000 to 40,000, particularly preferably from 8,000 to 35,000, g/mol, a viscosity number in the range from 30 to 450, preferably from 50 to 400, g/ml (measured in o-dichlorobenzene/phenol (50/50 ratio by weight) at a concentration of 0.5% by weight of polyesteramide Q2 at 25° C.) and a melting point in the range from 50 to 235, preferably from 60 to 235° C.

The polyesteramides Q2 are obtained in general by reacting a mixture consisting essentially of (c1) polyesteramide P1, (c2) 0.01–50, preferably from 0.1 to 40, % by weight, based on (c1), of amino carboxylic acid B1, where the amino carboxylic acid B1 is selected from the group consisting of the natural amino acids, polyamides with a molecular weight not exceeding 18,000 g/mol, preferably not exceeding 15,000 g/mol, obtainable by polycondensation of a dicarboxylic acid with 4 to 6 carbon atoms and a diamine with 4 to 10 carbon atoms and compounds which are defined by the formulae IIa or IIb

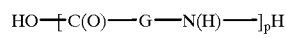

IIa

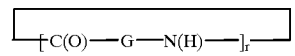

IIb where p is an integer from 1 to 1,500, preferably from 1 to 1,000, and r is 1, 2, 3 or 4, preferably 1 and 2, and G is a radical selected from the group consisting of phenylene, —$(CH_2)_n$—, where n is an integer from 1 to 12, preferably 1, 5 or 12, —$C(R^2)H$— and —$C(R^2)HCH_2$, where $R^2$ is methyl or ethyl, and polyoxazolines of the general formula III

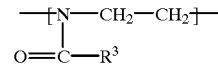

III where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl, (c3) 0–5, preferably from 0 to 4, mol %, based on component (b1) from the preparation of P1, of compound D.

The natural amino acids which are preferably used are the following: glycine, aspartic acid, glutamic acid, alanine, valine, leucine, isoleucine, tryptophan, phenylalanine and oligo- and polymers obtainable therefrom, such as polyaspartimides and polyglutamimides, particularly preferably glycine.

The polyamides employed are those obtainable by polycondensation of a dicarboxylic acid with 4 to 6 carbon atoms and a diamine with 4 to 10 carbon atoms, such as tetramethylenediamine, pentamethylenediamine, hexamethylenediamine, heptamethylenediamine, octamethylenediamine, nonamethylenediamine and decamethylenediamine.

Preferred polyamides are polyamide -46, polyamide-66 and polyamide-610. These polyamides are generally prepared by conventional methods. It is self-evident that these polyamides can contain conventional additives and auxiliaries and that these polyamides can be prepared by using appropriate regulators.

The polyoxazolines III are, as a rule, prepared by the process described in DE-A 1 206 585.

Particularly preferred compounds defined by the formulae IIa or IIb are: 6-aminohexanoic acid, caprolactam, laurolactam and the oligomers and polymers thereof with a molecular weight not exceeding 18,000 g/mol.

The reaction of the polyesteramides P1 with the amino carboxylic acid B1, if required in the presence of compound D, preferably takes place in the melt at from 120 to 260° C. under an inert gas atmosphere, if desired also under reduced pressure. The procedure can be both batchwise and continuous, for example in stirred vessels or (reaction) extruders.

The reaction rate can, if required, be increased by adding conventional transesterification catalysts (see those described hereinbefore for the preparation of the polyesteramides P1).

When components B1 with higher molecular weights, for example with a p above 10 (ten) are used, it is possible to obtain, by reaction with the polyesteramides P1 in stirred vessels or extruders, the desired block structures by the choice of the reaction conditions such as temperature, buildup time and addition of transesterification catalysts such as the abovementioned. Thus, J. of Appl. Polym. Sci., 32 (1986) 6191–6207 and Makromol. Chemie 136 (1970) 311–313 disclose that in the reaction in the melt it is possible to obtain from a blend by transesterification reactions initially block copolymers and then random copolymers.

The polymers T1 are, as a rule, prepared in a similar way to the polyesteramides Q1.

The biodegradable polymers T2 according to the invention have a molecular weight ($M_n$) in the range from 6,000 to 50,000, preferably from 8,000 to 40,000, particularly preferably from 8,000 to 35,000, g/mol, a viscosity number in the range from 30 to 450, preferably from 50 to 400, g/ml (measured in o-dichlorobenzene/phenol (50/50 ratio by weight) at a concentration of 0.5% by weight of polymer T2 at 25° C.) and a melting point in the range from 50 to 255, preferably from 60 to 255° C.

The biodegradable polymers T2 are obtained according to the invention by reacting the polyesteramides Q1 with (e1) 0.01–50, preferably from 0.1 to 40, % by weight, based on polyesteramide Q1, of the amino carboxylic acid B1 and with (e2) 0–5, preferably from 0 to 4, mol %, based on component (b1) from the preparation of polyesteramide Q1 via polyesteramide P1, of compound D, the procedure expediently being similar to the reaction of polyesteramide P1 with amino carboxylic acid B1 to give polyesteramide Q2.

The biodegradable polymers T3 according to the invention have a molecular weight ($M_n$) in the range from 6,000 to 50,000, preferably from 8,000 to 40,000, particularly preferably from 8,000 to 35,000, g/mol, a viscosity number in the range from 30 to 450, preferably from 50 to 400, g/ml (measured in o-dichlorobenzene/phenol (50/50 ratio by weight) at a concentration of 0.5% by weight of polymer T3 at 25° C.) and a melting point in the range from 50 to 255, preferably from 60 to 255° C.

The biodegradable polymers T3 are obtained according to the invention by reacting (f1) polyesteramide P2, or (f2) a mixture consisting essentially of polyesteramide P1 and 0.01–50, preferably from 0.1 to 40, % by weight, based on polyesteramide P1, of amino carboxylic acid B1, or (f3) a mixture consisting essentially of polyesteramides P1 which differ from one another in composition, with 0.1–5, preferably from 0.2 to 4, particularly preferably from 0.3 to 2.5, % by weight, based on the amount of polyesteramides used, of divinyl ether C1 and with 0–5, preferably from 0 to 4, mol %, based on the particular molar amounts of component (b1) used to prepare the polyesteramides (f1) to (f3) used, of compound D, the reactions expediently being carried out in a similar way to the polyesteramides Q1 from the polyesteramides P1 and the divinyl ethers C1.

Preferred biodegradable polyesteramides P2 have a molecular weight ($M_n$) in the range from 4,000 to 40,000, preferably from 5,000 to 35,000, particularly preferably from 8,000 to 35,000, g/mol, a viscosity number in the range from 30 to 450, preferably from 50 to 400, g/ml (measured in o-dichlorobenzene/phenol (50/50 ratio by weight) at a concentration of 0.5% by weight of polyesteramide P2 at 25° C.) and a melting point in the range from 50 to 255, preferably from 60 to 255° C.

The biodegradable polyesteramides P2 are generally obtained by reacting a mixture consisting essentially of (g1) a mixture consisting essentially of
  35–95, preferably from 45 to 80, particularly preferably from 45 to 70, mol % of adipic acid or ester-forming derivatives thereof or mixtures thereof,
  5–65, preferably from 20 to 55, particularly preferably from 30 to 55, mol % of terephthalic acid or ester-forming derivatives thereof or mixtures thereof, and
  0–5, preferably from 0 to 3, particularly preferably from 0.1 to 2, mol % of a compound containing sulfonate groups,
where the total of the individual mole percentages is 100 mol %, (g2) mixture (b2),
where the molar ratio (g1) to (g2) is chosen in the range from 0.4:1 to 1.5:1, preferably from 0.6:1 to 1.1:1, (g3) from 0.01 to 40, preferably from 0.1 to 30, % by weight, based on component (g1) of an amino carboxylic acid B1, and (g4) from 0 to 5, preferably from 0 to 4, particularly preferably from 0.01 to 3.5, mol %, based on component (g1), of compound D.

The low molecular weight and cyclic derivatives of the amino carboxylic acid B1 are particularly preferred for preparing polyesteramide P2.

The biodegradable polyesteramides P2 are expediently prepared in a similar way to the polyesteramides P1, it being possible to add the amino carboxylic acid B1 both at the start of the reaction and after the esterification or transesterification stage.

In a preferred embodiment, polyesteramides P2 whose repeating units are randomly distributed in the molecule are employed.

However, it is also possible to employ polyesteramides P2 whose polymer chains have block structures. Polyesteramides P2 of this type can generally be obtained by appropriate choice, in particular of the molecular weight, of the amino carboxylic acid B1. Thus, according to observations to date, there is generally only incomplete transesterification when a high molecular weight amino carboxylic acid B1 is used, in particular with a p of above 10, for example even in the presence of the inactivators described above (see J. of Appl. Polym. Sci. 32 (1986) 6191–6207 and Makromol. Chemie. 136 (1970) 311–313). If required, the reaction can also be carried out in solution using the solvents mentioned for the preparation of the polymers T1 from the polyesteramides Q2 and the divinyl ethers C1.

The biodegradable thermoplastic molding compositions T4 are obtained according to the invention by mixing in a conventional way, preferably with the addition of conventional additives such as stabilizers, processing aids, fillers etc. (see J. of Appl. Polym. Sci. 32 (1986) 6191–6207; WO 92/0441; EP 515203; Kunststoff-Handbuch, Vol. 3/1, Carl Hanser Verlag, Munich, 1992, pages 24–28).

(h1) 99.5–0.5% by weight of polyesteramides Q1 with
(h2) 0.5–99.5% by weight of hydroxy carboxylic acid H1 of the general formula IVa or IVb

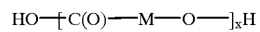   IVa

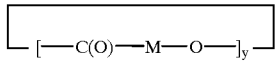   IVb where x is an integer from 1 to 1,500, preferably from 1 to 1,000, and y is 1, 2, 3 or 4, preferably 1 and 2, and M is a radical selected from the group consisting of phenylene, —$(CH_2)_z$—, where z is an integer from 1, 2, 3, 4 or 5, preferably 1 or 5, —$C(R^2)H$— and —$C(R^2)HCH_2$, where $R^2$ is methyl or ethyl.

The hydroxy carboxylic acid H1 employed in a preferred embodiment is: glycolic acid, D-, L- or D,L-lactic acid, 6-hydroxyhexanoic acid, the cyclic derivatives thereof such as glycolide (1,4-dioxane-2,5-dione), D-, L-dilactide (3,6-dimethyl-1,4-dioxane-2,5-dione), p-hydroxybenzoic acid and the oligomers and polymers thereof, such as poly-3-hydroxybutyric acid, polyhydroxyvaleric acid, polylactide (obtainable as EcoPLA® (from Cargill) for example) and a mixture of poly-3-hydroxybutyric acid and polyhydroxyvaleric acid (the latter is obtainable from Zeneca under the name Biopol®).

In a preferred embodiment, high molecular weight hydroxy carboxylic acids H1 such as polycaprolactone or polylactide or polyglycolide with a molecualr weight ($M_n$) in the range from 10,000 to 150,000, preferably from 10,000 to 100,000, g/mol are employed.

WO 92/0441 and EP-A 515203 disclose that high molecualr weight polylactide without added plasticizers is too brittle for most applications. It is possible in a preferred embodiment to prepare a blend starting from 0.5–20, preferably from 0.5 to 10, % by weight of polyester and 99.5–80, preferably from 99.5 to 90, % by weight of polylactide, which displays a distinct improvement in the mechanical properties, for example an increase in the impact strength, compared with pure polylactide.

Another preferred embodiment relates to a blend obtainable by mixing from 99.5 to 40, preferably from 99.5 to 60, % by weight of polyesteramide Q1 and from 0.5 to 60, preferably from 0.5 to 40, % by weight of a high molecular weight hydroxy carboxylic acid B1, particularly preferably polylactide, polyglycolide, polycaprolactone and polyhydroxybutyric acid. Blends of this type are completely biodegradable and, according to observations to date, have very good mechanical properties.

According to observations to date, the thermoplastic molding compositions T4 according to the invention are preferably obtained by observing short mixing times, for example when carrying out the mixing in an extruder. It is also possible to obtain molding compositions which have predominantly blend structures by choice of the mixing parameters, in particular the mixing time and, if required, the use of inactivators, ie. it is possible to control the mixing process so that transesterification reactions can also take place at least partly.

In another preferred embodiment it is possible to replace 0–50, preferably 0–30, mol % of the adipic acid or the ester-forming derivatives thereof or the mixtures thereof by at least one other aliphatic $C_4$–$C_{10}$- or cycloaliphatic $C_5$–$C_{10}$-dicarboxylic acid or dimer fatty acids such as succinic acid, glutaric acid, pimelic acid, suberic acid, azelaic acid or sebacic acid or an ester derivative such as the di-$C_1$–$C_6$-alkyl esters thereof or the anhydrides thereof such as succinic anhydride, or mixtures thereof, preferably succinic acid, succinic anhydride, sebacic acid, dimer fatty acid and di-$C_1$–$C_6$-alkyl esters such as dimethyl, diethyl, di-n-propyl, diisobutyl, di-n-pentyl, dineopentyl, di-n-hexyl esters thereof, especially dimethyl succinate.

A particularly preferred embodiment relates to the use as component (b1) of the mixture, described in EP-A 7445, of succinic acid, adipic acid and glutaric acid and the $C_1$–$C_6$-alkyl esters thereof, especially the dimethyl esters and diisobutyl esters thereof.

In another preferred embodiment it is possible to replace 0–50, preferably 0–40, mol % of the terephthalic acid or the ester-forming derivatives thereof, or the mixtures thereof, by at least one other aromatic dicarboxylic acid such as isophthalic acid, phthalic acid or 2,6-naphthalenedicarboxylic acid, preferably isophthalic acid, or an ester derivative such as a di-$C_1$–$C_6$-alkyl ester, in particular the dimethyl ester, or mixtures thereof.

It should be noted in general that the various polymers according to the invention can be worked up in a conventional way by isolating the polymers or, in particular if it is wished to react the polyesteramides P1, P2, Q2 and Q1 further, by not isolating the polymers but immediately processing them further.

The polymers according to the invention can be applied to coating substrates by rolling, spreading, spraying or pouring. Preferred coating substrates are those which are compostable or rot such as moldings of paper, cellulose or starch.

The polymers according to the invention can also be used to produce moldings which are compostable. Moldings which may be mentioned by way of example are: disposable articles such as crockery, cutlery, refuse sacks, sheets for agriculture to advance harvesting, packaging sheets and vessels for growing plants.

It is furthermore possible to spin the polymers according to the invention into threads in a conventional way. The threads can, if required, be stretched, stretch-twisted, stretch-wound, stretch-warped, stretch-sized and stretch-texturized by customary methods. The stretching to flat yarn can moreover take place in the same working step (fully drawn yarn or fully oriented yarn) or in a separate step. The stretch warping, stretch sizing and stretch texturizing are generally carried out in a working step separate from the spinning. The threads can be further processed to fibers in a conventional way. Sheet-like structures can then be obtained from the fibers by weaving or knitting.

The moldings, coating compositions and threads etc. described above can, if required, also contain fillers which can be incorporated during the polymerization process at any stage or subsequently, for example in the melt of the polymers according to the invention.

It is possible to add from 0 to 80% by weight of fillers, based on the polymers according to the invention. Examples of suitable fillers are carbon black, starch, lignin powder, cellulose fibers, natural fibers such as sisal and hemp, iron oxides, clay minerals, ores, calcium carbonate, calcium sulfate, barium sulfate and titanium dioxide. The fillers can in some cases also contain stabilizers such as tocopherol (vitamin E), organic phosphorus compounds, mono-, di- and polyphenols, hydroquinones, diarylamines, thioethers, UV stabilizers, nucleating agents such as talc, and lubricants and mold release agents based on hydrocarbons, fatty alcohols, higher carboxylic acids, metal salts of higher carboxylic acids such as calcium and zinc stearate, and montan waxes. Such stabilizers etc. are described in detail in Kunststoff-Handbuch, Vol. 3/1, Carl Hanser Verlag, Munich, 1992, pages 24–28.

The polymers according to the invention can additionally be colored in any desired way by adding organic or inorganic dyes. The dyes can also in the widest sense be regarded as filler.

A particular application of the polymers according to the invention relates to the use as compostable sheet or a compostable coating as outer layer of diapers. The outer layer of the diapers effectively prevents penetration by liquids which are absorbed inside the diaper by the fluff and superabsorbers, preferably by biodegradable superabsorbers, for example based on crosslinked polyacrylic acid or crosslinked polyacrylamide. It is possible to use a web of a cellulose material as inner layer of the diaper. The outer layer of the described diapers is biodegradable and thus compostable. It disintegrates on composting so that the entire diaper rots, whereas diapers provided with an outer layer of, for example, polyethylene cannot be composted without previous reduction in size or elaborate removal of the polyethylene sheet.

Another preferred use of the polymers and molding compositions according to the invention relates to the production of adhesives in a conventional way (see, for example, Encycl. of Polym. Sci. and Eng. Vol.1, "Adhesive Compositions", pages 547–577). The polymers and molding compositions according to the invention can also be processed as disclosed in EP-A 21042 using suitable tackifying thermoplastic resins, preferably natural resins, by the methods described therein. The polymers and molding compositions according to the invention can also be further processed as disclosed in DE-A 4 234 305 to solvent-free adhesive systems such as hot melt sheets.

Another preferred application relates to the production of completely degradable blends with starch mixtures (preferably with thermoplastic starch as described in WO 90/05161) in a similar process to that described in DE-A 42 37 535. The polymers and thermoplastic molding compositions according to the invention can, according to observations to date, because of their hydrophobic nature, their mechanical properties, their complete biodegradability, their good compatibility with thermoplastic starch and not least because of their favorable raw material basis, advantageously be employed as synthetic blend component.

Further applications relate, for example, to the use of the polymers according to the invention in agricultural mulch, packaging material for seeds and nutrients, substrate in adhesive sheets, baby pants, pouches, bed sheets, bottles, boxes, dust bags, labels, cushion coverings, protective clothing, hygiene articles, handkerchiefs, toys and wipes.

Another use of the polymers and molding compositions according to the invention relates to the production of foams, generally by conventional methods (see EP-A 372 846; Handbook of Polymeric foams and Foam Technology, Hanser Publisher, Munich, 1991, pages 375–408). This normally entails the polymer or molding composition according to the invention being initially melted, if required with the addition of up to 5% by weight of compound D, preferably pyromellitic dianhydride and trimellitic anhydride, then a blowing agent being added and the resulting mixture being exposed to reduced pressure by extrusion, resulting in foaming.

The advantages of the polymers according to the invention over known biodegradable polymers are a favorable raw material basis with readily available starting materials such as adipic acid, terephthalic acid and conventional diols, interesting mechanical properties due to the combination of "hard" (owing to the aromatic dicarboxylic acids such as terephthalic acid) and "soft" (owing to the aliphatic dicarboxylic acids such as adipic acid) segments in the polymer chain and the variation in uses due to simple modifications, a satisfactory degradation by microorganisms, especially in compost and soil, and a certain resistance to microorganisms in aqueous systems at room temperature, which is particularly advantageous for many applications. The random incorporation of the aromatic dicarboxylic acids of component (b1) in various polymers makes the biological attack possible and thus achieves the desired biodegradability.

A particular advantage of the polymers according to the invention is that it is possible by tailoring the formulations to optimize both the biodegradation and the mechanical properties for the particular application.

It is furthermore possible depending on the preparation process advantageously to obtain polymers with predominantly random distribution of monomer units, polymers with predominantly block structures and polymers with predominantly blend structure or blends.

EXAMPLES

Abbreviations

TTB: Titanium tetrabutoxide
DMT: Dimethyl terephthalate
Preparation of a Polyesteramide $Q1_a$ The preparation took place in three steps via two precursors.

Precursor $1_a$ 4.672 kg of 1,4-butanediol, 7.000 kg of adipic acid and 50 g of tin dioctoate were heated under inert gas (nitrogen) to 230–240° C. After most of the water formed in the reaction had distilled out, 10 g of TTB were added. As soon as the acid number AN had fallen below 1, the excess butanediol was distilled out under reduced pressure until the OH number reached about 56.

Precursor $2_a$ 58.5 g of DMT were heated with 36.5 g of ethanolamine while stirring slowly under a nitrogen atmosphere to 180° C. After 30 min, 360 g of precursor 1, 175 g of DMT, 0.65 g of pyromellitic dianhydride, 340 g of 1,4-butanediol and 1 g of TTB were added under a nitrogen atmosphere. The methanol and water formed during the transesterification were removed by distillation. The mixture was heated to 230° C. over the course of 3 h while increasing the stirring speed and, after 2 h, 0.4 g of 50% strength aqueous phosphorous acid was added. Over the course of 2 h, the pressure was reduced to 5 mbar and was then kept below 2 mbar and at 240° C. for 45 min, during which the excess 1,4-butanediol distilled out. An elastic, pale brown product was obtained.

OH number: 15 mg KOH/g
AN: below 1 mg KOH/g
prim. amine: below 0.1 g/100 g.

DSC measurements revealed two melting points at 64 and 88° C. and a glass transition temperature of −31° C.

200 g of the precursor $2_a$ were cooled to 170° C., and 3.8 g of 1,4-butanediol divinyl ether were added in 3 portions over the course of 40 min. The increase in molecular weight was evident from the distinct increase in the melt viscosity.

OH number: 4 mg KOH/g
AN: below 1 mg KOH/g.
Preparation of Polyesteramide $Q1_b$ The preparation took place in three steps starting from precursor $1_a$.

Precursor $2_b$ 240 g of DMT were heated with 69.7 g of hexamethylenediamine and 6.1 g of ethanolamine while stirring slowly under a nitrogen atmosphere to 180° C. After 30 min, 360 g of precursor $1_a$, 8 g of dimethyl sodium sulfoisophthalate, 340 g of 1,4-butanediol and 1 g of TTB were added under a nitrogen atmosphere. The methanol formed during the transesterification was removed by distillation. The mixture was heated to 230° C. over the course of 3 h while increasing the stirring speed and, after 2 h, 0.4 g of 50% strength aqueous phosphorous acid was added. The pressure was reduced stepwise to 5 mbar in the course of 2 h and then kept at below 2 mbar and at 230° C. for 45 min, during which the excess 1,4-butanediol distilled out. An elastic, light brown product was obtained.
OH number: 17 mg KOH/g
AN: 2.4 mg KOH/g
prim. amine: below 0.1 g/100 g DSC measurements revealed a melting point at 121° C. and a glass transition temperature of −35° C.

200 g of precursor $2_b$ were cooled to 170° C., and 4.4 g of 1,4-butanediol divinyl ether were added in 3 portions over the course of 40 min. The increase in molecular weight was evident from the distinct increase in the melt viscosity.
OH number: 5 mg KOH/g
AN: below 1 mg KOH/g
Preparation of a Polyesteramide $P2_c$ The preparation took place in three steps starting from precursor $1_a$.

Precursor $2_c$ 360.4 g of precursor $1_a$, 233 g of DMT, 340 g of 1,4-butanediol, 6.1 g of ethanolamine, 62.5 g of an extracted and dried polyamide with less than 0.4% by weight of residual extract and a viscosity number of 85 (eg. Ultramid® B15 from BASF) and 1 g of TTB were heated under a nitrogen atmosphere while stirring slowly to 180° C. The methanol formed during the transesterification was distilled out. The mixture was heated to 230° C. over the course of 3 h while increasing the stirring speed. After 2 h, 0.4 g of 50% strength aqueous phosphorous acid was added. The pressure was reduced to 5 mbar over the course of 2 h and then kept below 2 mbar and at 240° C. for 1 h, during which the excess 1,4-butanediol distilled out.
OH number: 9 mg KOH/g
AN: 0.6 mg KOH/g Viscosity number: 98.9

DSC measurements revealed two melting points at 104 and 215° C. and a glass transition temperature at −37° C.

200 g of precursor $2_c$ were cooled to 170° C., and 2.4 g of 1,4-butanediol divinyl ether were added in 3 portions over the course of 40 min. The increase in molecular weight was evident from the distinct increase in the melt viscosity.
OH number: 4 mg KOH/g
AN: below 1 mg KOH/g Enzyme assay with Rhizopus arrhizus: ΔDOC: 272 mg/l/ ΔDOC (PCL): 2019.
Methods of Measurement
Enzyme Assay The polymers were cooled with liquid nitrogen or dry ice in a mill and finely ground (the rate of enzymatic breakdown increases with the surface area of the milled material). The enzyme assay was carried out by placing 30 mg of finely ground polymer powder and 2 ml of a 20 mmol/l aqueous $K_2HPO_4/KH_2PO_4$ buffer solution (pH: 7.0) in an Eppendorf tube (2 ml) and equilibrated on a rotator at 37° C. for 3 h. Subsequently 100 units of lipase from either Rhizopus arrhizus, Rhizopus delemar or Pseudomonas pl. were added and incubated on the rotator (250 rpm) at 37° C. for 16 h. The reaction mixture was then filtered through a Millipore® membrane (0.45 µm), and the DOC (dissolved organic carbon) of the filtrate was measured. Similar DOC measurements were carried out in one case only with buffer and enzyme (as enzyme control) and in one case only with buffer and sample (as blank).

The ΔDOC values found (DOC (sample+enzyme)—DOC (enzyme control)—DOC (blank value)) can be regarded as a measure of the enzymatic degradability of the samples. They are presented in each case comparing with a measurement with powder from polycaprolactone® Tone P 787 (Union Carbide). It must be remembered in the assessment that these are not absolutely quantifiable data. The connection between the surface area of the milled material and the speed of enzymatic breakdown has been referred to above. Furthermore the enzyme activities may also vary.

The hydroxyl number (OH number) and acid number (AN) were determined by the following methods:
(a) Determination of the Apparent Hydroxyl Number 10 ml of toluene and 9.8 ml of acetylating reagent (see below) were added to about 1 to 2 g of accurately weighed test substance and heated at 95° C. with stirring for 1 h. Then 5 ml of distilled water were added. After cooling to room temperature, 50 ml of tetrahydrofuran (THF) were added, and potentiographic titration to the turning point was carried out with standard ethanolic KOH solution.

The experiment was repeated without test substance (blank sample).

The apparent OH number was then found from the following formula:
apparent OH number $c \times t \times 56.1 (V2-V1)/m$ (in mg KOH/g)
where c=amount of substance concentration of the standard ethanolic KOH solution in mol/l
t=titer of the standard ethanolic KOH solution
m=weight of test substance in mg
V1=ml of standard solution used with test substance
V2=ml of standard solution used without test substance.
Reagents used:
standard ethanolic KOH solution, c=0.5 mol/l, titer 0.9933 (Merck, Cat. No. 1.09114)
acetic anhydride, analytical grade (Merck, Cat. No. 42)
pyridine, analytical grade (Riedel de Haen, Cat. No. 33638)
acetic acid, analytical grade (Merck, Cat. No. 1.00063)
acetylating reagent: 810 ml of pyridine, 100 ml of acetic anhydride and 9 ml of acetic acid
water, deionized
THF and toluene
(b) Determination of the Acid Number (AN)

About 1 to 1.5 g of test substance were weighed accurately, 10 ml of toluene and 10 ml of pyridine were added, and the mixture was then heated to 95° C. After dissolving, the solution was cooled to room temperature, 5 ml of water and 50 ml of THF were added, and titration was carried out with 0.1 N standard ethanolic KOH solution.

The determination was repeated without test substance (blank sample).

The acid number was then found from the following formula:
$AN = c \times t \times 56.1 (V1-V2)/m$ (in mg KOH/g)
where
c=amount of substance concentration of the standard ethanolic KOH solution in mol/l
t=titer of the standard ethanolic KOH solution
m=weight of test substance in mg
V1=ml of standard solution used with test substance
V2=ml of standard solution used without test substance.
Reagents used:
standard ethanolic KOH solution, c=0.1 mol/l, titer=0.9913 (Merck, Cat. No. 9115)

pyridine, analytical grade (Riedel de Haen, Cat. No. 33638)
water, deionized
THF and toluene (c) Determination of the OH number The OH number is obtained from the sum of the apparent OH number and the AN:

OH number=apparent OH number+AN

The viscosity number (VN) was measured in o-dichlorobenzene/phenol (50/50 ratio by weight) at a concentration of 0.5% by weight of polymer at 25° C.

The DSC measurements were carried out with a DuPont DSC 912 apparatus+thermal analyzer 990. The temperature and enthalpy calibration took place in a conventional way. The weight of sample was typically 13 mg. The heating and cooling rates were 20 K/min. The samples were measured under the following conditions: 1. Heating run on samples in the state supplied, 2. Rapid cooling from the melt, 3. Heating run on the samples cooled from the melt (samples from 2). The second DSC runs in each case were used to compare various samples after a uniform thermal history.

What is claimed is:

1. A biodegradable polyesteramide Q1 with a molecular weight ($M_n$) of from 5,000 to 50,000 g/mol, a viscosity number of from 30 to 450 g/ml (measured in o-dichlorobenzene/phenol (50/50 ratio by weight) at a concentration of 0.5% by weight of polyesteramide Q1 at 25° C.) and a melting point of from 50 to 220° C., obtained by reacting a mixture consisting essentially of (a1) from 95 to 99.9% by weight of a polyesteramide P1 obtained by reacting a mixture consisting essentially of (b1) a mixture consisting essentially of 35–95 mol % of adipic acid or ester-forming derivatives thereof or mixtures thereof, 5–65 mol % of terephthalic acid or ester-forming derivatives thereof or mixtures thereof, and 0–5 mol % of a compound containing sulfonate groups, where the total of the individual mole percentages is 100 mol %, and (b2) a mixture consisting essentially of (b21) 99.5–0.5 mol % of a dihydroxy compound selected from the group consisting of $C_2$–$C_6$-alkanediols and $C_5$–$C_{10}$-cycloalkanediols, (b22) 0.5–99.5 mol % of an amino-$C_2$–$C_{12}$-alkanol or of an amino-$C_5$–$C_{10}$-cycloalkanol, and (b23) 0–50 mol % of a diamino-$C_1$–$C_8$-alkane, (b24) 0–50 mol % of a 2,2'-bisoxazoline of the general formula I

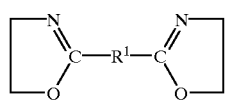

where $R^1$ is a single bond, a $(CH_2)_q$-alkylene group with q=2, 3 or 4, or a phenylene group, where the total of the individual mole percentages is 100 mol %, and where the molar ratio of (b1) to (b2) is from 0.4:1 to 1.5:1, with the proviso that the polyesteramide P1 has a molecular weight ($M_n$) of from 4,000 to 40,000 g/mol, a viscosity number of from 30 to 350 g/ml (measured in o-dichlorobenzene/phenol (50/50 ratio by weight) at a concentration of 0.5% by weight of polyesteramide P1 at 25° C.) and a melting point of from 50 to 220° C., and with the further proviso that from 0 to 5 mol %, based on the molar amount of component (a1) used, of at least one compound D having three to six hydroxyl groups or carboxyl groups or mixtures thereof or anhydrides or dianhydrides of the carboxyl groups are used to prepare the polyesteramide P1, (a2) from 0.1 to 5% by weight of a divinyl ether C1 and (a3) from 0 to 5 mol %, based on component (b1) from the preparation of P1 of at least one compound D having three to six hydroxyl groups or carboxyl groups or mixtures thereof or anhydrides or dianhydrides of the carboxyl groups.

2. A biodegradable polymer T1 with a molecular weight ($M_n$) of from 6,000 to 50,000 g/mol, with a viscosity number of from 30 to 450 g/ml (measured in o-dichlorobenzene/phenol (50/50 ratio by weight) at a concentration of 0.5% by weight of polymer T1 at 25° C.) and a melting point of from 50 to 255° C., obtained by reacting a polyesteramide Q2 with a molecular weight ($M_n$) of from 5,000 to 50,000 g/mol, a viscosity number of from 30 to 450 g/ml (measured in o-dichlorobenzene/phenol (50/50 ratio by weight) at a concentration of 0.5% by weight of polymer Q2 at 25° C.) and a melting point of from 50 to 255° C., obtained by reacting a mixture consisting essentially of (c1) polyesteramide P1, as claimed in claim 1, (c2) 0.01–50% by weight, based on (c1), of an amino carboxylic acid, where the amino carboxylic acid is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIa and IIb

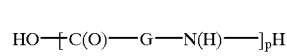

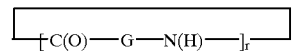

where p is an integer from 1 to 1,500 and r is an integer from 1 to 4, and G is a radical which is selected from the group consisting of phenylene, —$(CH_2)_n$—, where n is an integer from 1 to 12, —$C(R^2)H$— and —$C(R^2)HCH_2$, where $R^2$ is methyl or ethyl, and polyoxazolines with repeating unit III

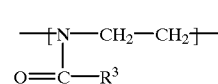

where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl, (c3) 0–5 mol %, based on component (b1) from the preparation of P1, of at least one compound D having three to six hydroxyl groups or carboxyl groups or mixtures thereof or anhydrides or dianhydrides of the carboxyl groups, with (d1) 0.1–5% by weight, based on the polyesteramide Q2, of divinyl ether C1 and with (d2) 0–5 mol %, based on component (b1) which was used for the preparation of polyesteramide Q2, of at least one compound D having three to six hydroxyl groups or carboxyl groups or mixtures thereof or anhydrides or dianhydrides of the carboxyl groups.

3. A biodegradable polymer T2 with a molecular weight ($M_n$) of from 6,000 to 50,000 g/mol, with a viscosity number of from 30 to 450 g/ml (measured in o-dichlorobenzene/phenol (50/50 ratio by weight) at a concentration of 0.5% by weight of polymer T2 at 25° C.) and a melting point of from 50 to 255° C., obtained by reacting a polyesteramide Q1 with a molecular weight ($M_n$) of from 5,000 to 50,000 g/mol, a viscosity number of from 30 to 450 g/ml (measured in o-dichlorobenzene/phenol (50/50 ratio by weight) at a concentration of 0.5% by weight of polymer Q1 at 25° C.) and a melting point of from 50 to 220° C., obtained by reacting a mixture consisting essentially of (a1) from 95 to 99.9% by weight of a polyesteramide P1 as claimed in claim 1, (a2) from 0.1 to 5% by weight of a divinyl ether C1 and (a3) from 0 to 5 mol %, based on the molar amount of component (b1) used for the preparation of P1, of at least one compound D having three to six hydroxyl groups or carboxyl groups or mixtures thereof or anhydrides or dianhydrides of the carboxyl groups, with (e1) 0.01–50% by weight, based on polyesteramide Q1, of amino carboxylic acid B1 where the amino carboxylic acid is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIa and IIb

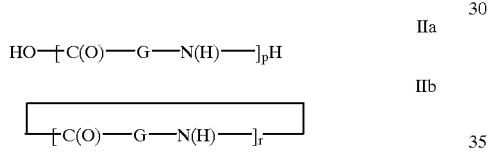

where p is an integer from 1 to 1,500 and r is an integer from 1 to 4, and G is a radical which is selected from the group consisting of phenylene, —($CH_2$)$_n$—, where n is an integer from 1 to 12, —C($R^2$)H— and —C($R^2$)$HCH_2$, where $R^2$ is methyl or ethyl, and polyoxazolines with repeating unit III

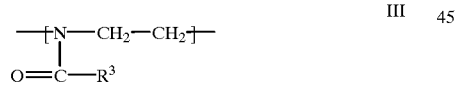

where $R^3$ is hydrogen, $C_1$–$C_8$-alkyl, $C_5$–$C_8$cycloalkyl, phenyl which is unsubstituted or substituted up to three times by $C_1$–$C_4$-alkyl groups, or tetrahydrofuryl, and with (e2) 0–5 mol %, based on the molar amount of component (b1) used for the preparation of polyesteramide Q1, of at least one compound D having three to six hydroxyl groups or carboxyl groups or mixtures thereof or anhydrides or dianhydrides of the carboxyl groups.

4. A biodegradable polymer T3 with a molecular weight ($M_n$) of from 6,000 to 50,000 g/mol, with a viscosity number of from 30 to 450 g/ml (measured in o-dichlorobenzene/phenol (50/50 ratio by weight) at a concentration of 0.5% by weight of polymer T3 at 25° C.) and a melting point of from 50 to 255° C., obtained by reacting (f1) polyesteramide P2 with a molecular weight ($M_n$) of from 4,000 to 40,000 g/mol, a viscosity number of from 30 to 450 g/ml (measured in o-dichlorobenzene/phenol (50/50 ratio by weight) at a concentration of 0.5% by weight of polyesteramide P2 at 25° C.) and a melting point of from 50 to 255° C., obtained by reacting a mixture consisting essentially of (g1) a mixture consisting essentially of 35–95 mol % of adipic acid or ester-forming derivatives thereof or mixtures thereof, 5–65 mol % of terephthalic acid or ester-forming derivatives thereof or mixtures thereof, and 0–5 mol % of a compound containing sulfonate groups, where the total of the individual mole percentages is 100 mol %, (g2) mixture (b2), a mixture consisting essentially of (b21) 99.5–0.5 mol % of a dihydroxy compound selected from the group consisting of $C_2$–$C_6$-alkanediols and $C_5$–$C_{10}$-cycloalkanediols, (b22) 0.5–99.5 mol % of an amino-$C_2$–$C_{12}$-alkanol or of an amino-$C_5$–$C_{10}$-cycloalkanol, and (b23) 0–50 mol % of a diamino-$C_1$–$C_8$-alkane, (b24) 0–50 mol % of a 2,2'-bisoxazoline of the general formula I

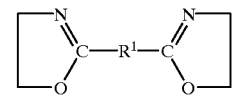

where $R^1$ is a single bond, a ($CH_2$)$_q$-alkylene group with q=2, 3 or 4, or a phenylene group, where the total of the individual mole percentages is 100 mol %, and where the molar ratio of (g1) to (g2) is from 0.4:1 to 1.5:1, (g3) from 0.01 to 40 mol %, based on component (g1), of amino carboxylic acid where the amino carboxylic acid is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIa and IIb

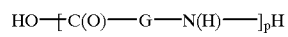
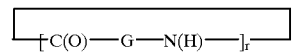

where p is an integer from 1 to 1,500 and r is an integer from 1 to 4, and G is a radical which is selected from the group consisting of phenylene, —($CH_2$)$_n$—, where n is an integer from 1 to 12, —C($R^2$)H— and —C($R^2$)$HCH_2$, where $R^2$ is methyl or ethyl, and polyoxazolines with repeating unit III

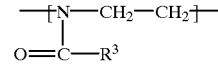

where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl, (g4) from 0 to 5 mol %, based on component (g1), of at least one compound D having three to six hydroxyl groups or carboxyl groups or mixtures thereof or anhydrides or dianhydrides of the carboxyl groups or (f2) a mixture consisting essentially of polyesteramide P1 as claimed in claim 1 and 0.01–50% by weight, based on polyesteramide P1, of amino carboxylic acid, or (f3) a mixture consisting essentially of polyesteramides P1, which differ from one another in composition, with 0.1–5% by weight, based on the amount of polyesteramides used, of divinyl ether C1 and with 0–5 mol %, based on the particular molar amounts of component (b1) used to prepare the polyester (f1) to (f3) used, of at least one compound D having three to six hydroxyl groups or carboxyl groups or mixtures thereof or anhydrides or dianhydrides of the carboxyl groups.

5. A biodegradable thermoplastic molding composition T4 obtained by mixing in a conventional way (h1) 99.5–0.5% by weight of polyesteramide Q1 with a molecular weight ($M_n$) of from 5,000 to 50,000 g/mol, a viscosity number of from 30 to 450 g/ml (measured in o-dichlorobenzene/phenol (50/50 ratio by weight) at a concentration of 0.5% by weight of polyesteramide Q1 at 25° C.) and a melting point of from 50 to 220° C., obtained by reacting a mixture consisting essentially of (a1) from 95 to 99.9% by weight of a polyesteramide P1 as claimed in claim 1, (a2) from 0–1 to 5% by weight of a divinyl ether C1 and (a3) from 0 to 5 mol %, based on the molar amount of component (b1) used for the preparation of P1, of at least one compound D having three to six hydroxyl groups or carboxyl groups or mixtures thereof or anhydrides or dianhydrides of the carboxyl groups, with (h2) 0.5–99.5% by weight of a hydroxy carboxylic acid of the general formula IVa or IVb

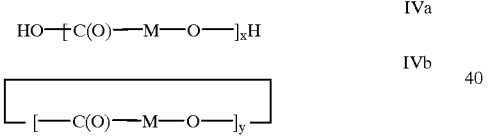

where x is an integer from 1 to 1,500 and y is an integer from 1 to 4, and M is a radical selected from the group consisting of phenylene, —$(CH_2)_z$—, where z is an integer from 1 to 5, —$C(R^2)H$— and —$C(R^2)HCH_2$, where $R^2$ is methyl or ethyl.

6. A process for preparing the biodegradable polyesteramides Q1 with a molecular weight ($M_n$) of from 5,000 to 50,000 g/mol, a viscosity number of from 30 to 450 g/ml (measured in o-dichlorobenzene/phenol (50/50 ratio by weight) at a concentration of 0.5% by weight of polyesteramide Q1 at 25° C.) and a melting point of from 50 to 220° C., which comprises in a first step preparing (a1) polyesteramide P1 obtained by reacting a mixture consisting essentially of (b1) a mixture consisting essentially of 35–95 mol % of adipic acid or ester-forming derivatives thereof or mixtures thereof, 5–65 mol % of terephthalic acid or ester-forming derivatives thereof or mixtures thereof, and 0–5 mol % of a compound containing sulfonate groups, where the total of the individual mole percentages is 100 mol %, and (b2) a mixture consisting essentially of (b21) 99.5–0.5 mol % of a dihydroxy compound selected from the group consisting of $C_2$–$C_6$-alkanediols and $C_5$–$C_{10}$-cycloalkanediols, (b22) 0.5–99.5 mol % of an amino-$C_2$–$C_{12}$-alkanol or of an amino-$C_5$–$C_{10}$-cycloalkanol, and (b23) 0–50 mol % of a diamino-$C_1$–$C_8$-alkane, (b24) 0–50 mol % of a 2,2'-bisoxazoline of the general formula I

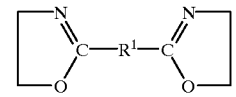

where $R^1$ is a single bond, a $(CH_2)_q$-alkylene group with q=2, 3 or 4, or a phenylene group, where the total of the individual mole percentages is 100 mol %, and where the molar ratio of (b1) to (b2) is from 0.4:1 to 1.5:1, with the proviso that the polyesteramide P1 has a molecular weight ($M_n$) of from 4,000 to 40,000 g/mol, a viscosity number of from 30 to 350 g/ml (measured in o-dichlorobenzene/phenol (50/50 ratio by weight) at a concentration of 0.5% by weight of polyesteramide P1 at 25° C.) and a melting point of from 50 to 220° C., and with the further proviso that from 0 to 5 mol %, based on the molar amount of component (a1) used, of at least one compound D having three to six hydroxyl groups or carboxyl groups or mixtures thereof or anhydrides or dianhydrides of the carboxyl groups are used to prepare the polyesteramide P1, and in a second step reacting a mixture consisting essentially of from 95 to 99.5% by weight of (a1), (a2) from 0.1 to 5% by weight of divinyl ether C1 and (a3) from 0 to 5 mol %, based on the molar amount of component (b1) used for the preparation of P1, of at least one compound D having three to six hydroxyl groups or carboxyl groups or mixtures thereof or anhydrides or dianhydrides of the carboxyl groups.

7. A process for preparing the biodegradable polymers T1 with a molecular weight ($M_n$) of from 6,000 to 50,000 g/mol, with a viscosity number of from 30 to 450 g/ml (measured in o-dichlorobenzene/phenol (50/50 ratio by weight) at a concentration of 0.5% by weight of polymer T1 at 25° C.) and a melting point of from 50 to 255° C., which comprises in a first step preparing polyesteramide Q2 with a molecular weight ($M_n$) of from 5,000 to 50,000 g/mol, a viscosity number of from 30 to 450 g/ml (measured in o-dichlorobenzene/phenol (50/50 ratio by weight) at a concentration of 0.5% by weight of polymer Q2 at 25° C.) and a melting point of from 50 to 255° C., obtained by reacting a mixture consisting essentially of (c1) polyesteramide P1 as claimed in claim 1, (c2) 0.01–50% by weight, based on (c1), of an amino carboxylic acid, where the amino carboxylic acid is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIa and IIb

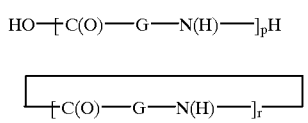

IIa

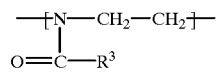

IIb where p is an integer from 1 to 1,500 and r is an integer from 1 to 4, and G is a radical which is selected from the group consisting of phenylene, —(CH$_2$)$_n$—, where n is an integer from 1 to 12, —C(R$^2$)H— and —C(R$^2$)HCH$_2$, where R$^2$ is methyl or ethyl,
and polyoxazolines with repeating unit III

—[N—CH$_2$—CH$_2$]—
       |
      O=C—R$^3$

III where R$^3$ is hydrogen, C$_1$–C$_6$-alkyl, C$_5$–C$_8$-cycloalkyl, phenyl which is unsubstituted or substituted up to three times by C$_1$–C$_4$-alkyl groups, or tetrahydrofuryl, (c3) 0–5 mol %, based on component (b1) from the preparation of P1, of at least one compound D having three to six hydroxyl groups or carboxyl groups or mixtures thereof or anhydrides or dianhydrides of the carboxyl groups, and in a second step reacting Q2 with (d1) 0.1–5% by weight, based on polyesteramide Q2, of divinyl ether C1 and with (d2) 0–5 mol %, based on the molar amount of component (b1) used for the preparation of polyesteramide Q2, of at least one compound D having three to six hydroxyl groups or carboxyl groups or mixtures thereof or anhydrides or dianhydrides of the carboxyl groups.

8. A process for preparing the biodegradable polymers T2 with a molecular weight (M$_n$) of from 6,000 to 50,000 g/mol, with a viscosity number of from 30 to 450 g/ml (measured in o-dichlorobenzene/phenol (50/50 ratio by weight) at a concentration of 0.5% by weight of polymer T2 at 25° C.) and a melting point of from 50 to 255° C., which comprises in a first step preparing polyesteramide Q1, with a molecular weight molecular weight (M$_n$) of from 5,000 to 50,000 g/mol, a viscosity number of from 30 to 450 g/ml (measured in o-dichlorobenzene/phenol (50/50 ratio by weight) at a concentration of 0.5% by weight of polymer Q1 at 25° C.) and a melting point of from 50 to 220° C., obtained by reacting a mixture consisting essentially of (a1) from 95 to 99.9% by weight of a polyesteramide P1 obtained by reacting a mixture consisting essentially of (b1) a mixture consisting essentially of 35–95 mol % of adipic acid or ester-forming derivatives thereof or mixtures thereof, 5–65mol % of terephthalic acid or ester-forming derivatives thereof or mixtures thereof, and 0–5 mol % of a compound containing sulfonate groups, where the total of the individual mole percentages is 100 mol %, and (b2) a mixture consisting essentially of (b21) 99.5–0.5 mol % of a dihydroxy compound selected from the group consisting of C$_2$–C$_6$-alkanediols and C$_5$–C$_{10}$-cycloalkanediols, (b22) 0.5–99.5 mol % of an amino-C$_2$–C$_{12}$-alkanol or of an amino-C$_5$–C$_{10}$-cycloalkanol, and (b23) 0–50 mol % of a diamino-C$_1$–C$_8$-alkane, (b24) 0–50 mol % of a 2,2'-bisoxazoline of the general formula I

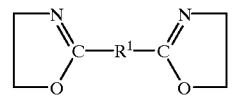

I where R$^1$ is a single bond, a (CH$_2$)$_q$-alkylene group with q=2, 3 or 4, or a phenylene group, where the total of the individual mole percentages is 100 mol %, and where the molar ratio of (b1) to (b2) is from 0.4:1 to 1.5:1, with the proviso that the polyesteramide P1 has a molecular weight (M$_n$) of from 4,000 to 40,000 g/mol, a viscosity number of from 30 to 350 g/ml (measured in o-dichlorobenzene/phenol (50/50 ratio by weight) at a concentration of 0.5% by weight of polyesteramide P1 at 25° C.) and a melting point of from 50 to 220° C., and with the further proviso that from 0 to 5 mol %, based on the molar amount of component (a1) used, of at least one compound D having three to six hydroxyl groups or carboxyl groups or mixtures thereof or anhydrides or dianhydrides of the carboxyl groups are used to prepare the polyesteramide P1, (a2) from 0.1 to 5% by weight of a divinyl ether C1 and (a3) from 0 to 5 mol %, based on the molar amount of component (b1) used for the preparation of P1, of at least one compound D having three to six hydroxyl groups or carboxyl groups or mixtures thereof or anhydrides or dianhydrides of the carboxyl groups, and in a second step reacting Q1 with (e1) 0.01–50% by weight, based on polyesteramide Q1, of amino carboxylic acid where the amino carboxylic acid is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIa and IIb

IIa

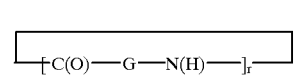

IIb where p is an integer from 1 to 1,500 and r is an integer from 1 to 4, and G is a radical which is selected from the group consisting of phenylene, —(CH$_2$)$_n$—, where n is an integer from 1 to 12, —C(R$^2$)H— and —C(R$^2$)HCH$_2$, where R$^2$ is methyl or ethyl,
and polyoxazolines with repeating unit III

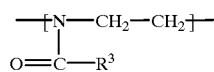

III where R$^3$ is hydrogen, C$_1$–C$_6$-alkyl, C$_5$–C$_8$-cycloalkyl, phenyl which is unsubstituted or substituted up to three times by C$_1$–C$_4$-alkyl groups, or tetrahydrofuryl, and with (e2) 0–5 mol %, based on the molar amount of component (b1) used for the preparation of polyesteramide Q1, of at least one compound D having three to six hydroxyl groups or carboxyl groups or mixtures thereof or anhydrides or dianhydrides of the carboxyl groups.

9. A process for preparing the biodegradable polymer T3 with a molecular weight ($M_n$) of from 6,000 to 50,000 g/mol, with a viscosity number of from 30 to 450 g/ml (measured in o-dichlorobenzene/phenol (50/50 ratio by weight) at a concentration of 0.5% by weight of polymer T3 at 25° C.) and a melting point of from 50 to 255° C., which comprises in a first step preparing (f1) polyesteramide P2 with a molecular weight ($M_n$) of from 4,000 to 40,000 g/mol, a viscosity number of from 30 to 450 g/ml (measured in o-dichlorobenzene/phenol (50/50 ratio by weight) at a concentration of 0.5% by weight of polyesteramide P2 at 25° C.) and a melting point of from 50 to 255° C., obtained by reacting a mixture consisting essentially of (g1) a mixture consisting essentially of
35–95 mol % of adipic acid or ester-forming derivatives thereof or mixtures thereof,
5–65 mol % of terephthalic acid or ester-forming derivatives thereof or mixtures thereof, and
0–5 mol % of a compound containing sulfonate groups, where the total of the individual mole percentages is 100 mol %, (g2) mixture (b2), a mixture consisting essentially of
(b21) 99.5–0.5 mol % of a dihydroxy compound selected from the group consisting of $C_2$–$C_6$-alkanediols and $C_5$–$C_{10}$-cycloalkanediols,
(b22) 0.5–99.5 mol % of an amino-$C_2$–$C_{12}$-alkanol or of an amino-$C_5$–$C_{10}$-cycloalkanol, and
(b23) 0–50 mol % of a diamino-$C_1$–$C_8$-alkane,
(b24) 0–50 mol % of a 2,2'-bisoxazoline of the general formula I

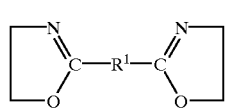

where $R^1$ is a single bond, a $(CH_2)_q$-alkylene group with q=2, 3 or 4, or a phenylene group, where the total of the individual mole percentages is 100 mol %, and where the molar ratio of (g1) to (g2) is from 0.4:1 to 1.5:1, (g3) from 0.01 to 40 mol %, based on component (g1), of amino carboxylic acid where the amino carboxylic acid is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIa and IIb

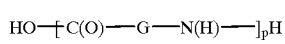

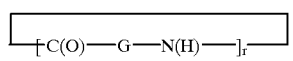

where p is an integer from 1 to 1,500 and r is an integer from 1 to 4, and G is a radical which is selected from the group consisting of phenylene, —$(CH_2)_n$—, where n is an integer from 1 to 12, —$C(R^2)H$— and —$C(R^2)HCH_2$, where $R^2$ is methyl or ethyl, and polyoxazolines with repeating unit III

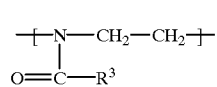

where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl, (g4) from 0 to 5 mol %, based on component (g1), of at least one compound D having three to six hydroxyl groups or carboxyl groups or mixtures thereof or anhydrides or dianhydrides of the carboxyl groups or (f2) a mixture consisting essentially of polyesteramide P1 obtained by reacting a mixture consisting essentially of (b1) a mixture consisting essentially of
35–95 mol % of adipic acid or ester-forming derivatives thereof or mixtures thereof,
5–65 mol % of terephthalic acid or ester-forming derivatives thereof or mixtures thereof, and
0–5 mol % of a compound containing sulfonate groups, where the total of the individual mole percentages is 100 mol %, and (b2) and where the molar ratio of (b1) to (b2) is chosen in the range from 0.4:1 to 1.5:1, with the proviso that the polyesteramide P1 has a molecular weight ($M_n$) of from 4,000 to 40,000 g/mol, a viscosity number of from 30 to 350 g/ml (measured in o-dichlorobenzene/phenol (50/50 ratio by weight) at a concentration of 0.5% by weight of polyesteramide P1 at 25° C.) and a melting point of from 50 to 220° C., and with the further proviso that from 0 to 5 mol %, based on the molar amount of component (a1) used, of at least one compound D having three to six hydroxyl groups or carboxyl groups or mixtures thereof or anhydrides or dianhydrides of the carboxyl groups are used to prepare the polyesteramide P1, and 0.1–50% by weight, based on polyesteramide P1, of amino carboxylic acid, or (f3) a mixture consisting essentially of polyesteramide P1 which differ from one another in composition, and in a second step reacting (f1) or (f2) or (f3) with 0.1–5% by weight, based on the amount of polyesteramides used, of divinyl ether C1 and with 0–5 mol %, based on the particular molar amounts of component (b1) or (g1) used to prepare the polyesteramides (f1) to (f3) used, of at least one compound D having three to six hydroxyl groups or carboxyl groups or mixtures thereof or anhydrides or dianhydrides of the carboxyl groups.

10. A process for preparing the biodegradable thermoplastic molding compositions $T4_1$, which comprises in a first step preparing polyetheresteramide Q1 with a molecular weight ($M_n$) of from 5,000 to 50,000 g/mol, a viscosity number of from 30 to 450 g/ml (measured in o-dichlorobenzene/phenol (50/50 ratio by weight) at a concentration of 0.5% by weight of polyesteramide Q1 at 25° C.) and a melting point of from 50 to 220° C., obtained by reacting a mixture consisting essentially of (a1) from 95 to 99.9% by weight of a polyesteramide P1 obtained by reacting a mixture consisting essentially of (b1) a mixture consisting essentially of
35–95 mol % of adipic acid or ester-forming derivatives thereof or mixtures thereof,
5–65 mol % of terephthalic acid or ester-forming derivatives thereof or mixtures thereof, and 0–5 mol % of a compound containing sulfonate groups, where the total of the individual mole percentages is 100 mol %, and (b2) a mixture consisting essentially of
(b21) 99.5–0.5 mol % of a dihydroxy compound selected from the group consisting of $C_2$–$C_6$-alkanediols and $C_5$–$C_{10}$-cycloalkanediols,
(b22) 0.5–99.5 mol % of an amino-$C_2$–$C_{12}$-alkanol or of an amino-$C_5$–$C_{10}$-cycloalkanol, and
(b23) 0–50 mol % of a diamino-$C_1$–$C_8$-alkane,
(b24) 0–50 mol % of a 2,2'-bisoxazoline of the general formula I

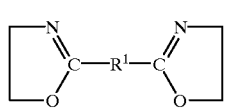

where $R^1$ is a single bond, a $(CH_2)_q$-alkylene group with q=2, 3 or 4, or a phenylene group, where the total of the individual mole percentages is 100 mol %, and where the molar ratio of (b1) to (b2) is from 0.4:1 to 1.5:1, with the proviso that the polyesteramide P1 has a molecular weight ($M_n$) of from 4,000 to 40,000 g/mol, a viscosity number of from 30 to 350 g/ml (measured in o-dichlorobenzene/phenol (50/50 ratio by weight) at a concentration of 0.5% by weight of polyesteramide P1 at 25° C.) and a melting point of from 50 to 220° C., and with the further proviso that from 0 to 5 mol %, based on the molar amount of component (a1) used, of at least one compound D having three to six hydroxyl groups or carboxyl groups or mixtures thereof or anhydrides or dianhydrides of the carboxyl groups are used to prepare the Polyesteramide P1, (a2) from 0.1 to 5% by weight of a divinyl ether C1 and (a3) from 0 to 5 mol %, based on the molar amount of component (b1) from the preparation of P1, of at least one compound D having three to six hydroxyl groups or carboxyl groups or mixtures thereof or anhydrides or dianhydrides of the carboxyl groups and in a second step mixing 99.5–0.5% by weight of polyesteramide Q1 with 0.5–99.5% by weight of hydroxy carboxylic acid H1.

11. A compostable molding made from biodegradable polyesteramides Q1 as claimed in claim 1.

12. A compostable molding made from biodegradable polyesteramides Q1 as claimed in claim 1.

13. A biodegradable blend made from biodegradable polyesteramides Q1 as claimed in claim 1 and starch.

14. A biodegradable foam made from biodegradable polyesteramides Q1 as claimed in claim 1.

15. A paper coating composition made from biodegradable polyesteramides Q1 as claimed in claim 1.

* * * * *

UNITED STATES PATENT AND TRADEMARK OFFICE
CERTIFICATE OF CORRECTION

PATENT NO. : 6,111,058
DATED : August 29, 2000
INVENTOR(S) : Warzelhan et al.

It is certified that error appears in the above-identified patent and that said Letters Patent is hereby corrected as shown below:

Column 19, claim 3,
Line 50, "$C_1$-$C_8$-alkyl" should be -- $C_1$-$C_6$-alkyl --.

Column 28, claim 10,
Line 8, "Polyesteramide" should be -- polyesteramide --.

Signed and Sealed this

Twenty-first Day of August, 2001

Attest:

NICHOLAS P. GODICI
*Attesting Officer*    *Acting Director of the United States Patent and Trademark Office*